United States Patent [19]

Tai et al.

[11] Patent Number: 5,483,362
[45] Date of Patent: Jan. 9, 1996

[54] COMPACT HOLOGRAPHIC SIGHT

[75] Inventors: Anthony M. Tai, Northville; Juris Upatnieks; Eric J. Sieczka, both of Ann Arbor, all of Mich.

[73] Assignee: Environmental Research Institute of Michigan, Ann Arbor, Mich.

[21] Appl. No.: 245,220

[22] Filed: May 17, 1994

[51] Int. Cl.[6] .............................. G02B 5/32; G03H 1/22; F41G 1/00
[52] U.S. Cl. .................... 359/1; 33/242; 33/252; 359/13; 359/15; 359/16; 359/19
[58] Field of Search .............................. 359/13, 14, 15, 359/16, 19, 32, 33, 1; 33/233, 242, 257, 252

[56] References Cited

U.S. PATENT DOCUMENTS

| | | | |
|---|---|---|---|
| 4,012,150 | 3/1977 | Upatnieks | 356/247 |
| 4,223,975 | 9/1980 | Upatnieks | 350/3.68 |
| 4,643,515 | 2/1987 | Upatnieks | 350/3.67 |
| 4,784,447 | 11/1988 | Latta et al. | 359/16 |
| 4,981,332 | 1/1991 | Smith | 359/16 |
| 5,148,314 | 9/1992 | Chen | 359/16 |
| 5,151,800 | 9/1992 | Upatnieks | 359/14 |
| 5,237,451 | 8/1993 | Saxe | 359/565 |
| 5,363,226 | 11/1994 | Strasser et al. | 359/569 |

*Primary Examiner*—Martin Lerner
*Attorney, Agent, or Firm*—Brooks & Kushman

[57] ABSTRACT

A holographic sight which includes a base having at least one connector for mounting the base on a small arm, and a hologram of a reticle pattern, a compact laser light source for illuminating the hologram, and a power source for the laser diode, each mounted on the base. The sight also includes an achromatizer supported in the path of the light beam for reducing shifts in the position of the reticle pattern due to variations in the wavelength of the light beam emitted from the laser diode. The sight may further include means for circularizing the generally elliptical beam emitted by the laser diode to provide a uniform illumination pattern for the hologram. A brightness adjuster and position adjuster, for varying the brightness and relative position of the reticle, respectively, may also be provided.

25 Claims, 8 Drawing Sheets

COMPACT HOLOGRAPHIC SIGHT

TECHNICAL FIELD

This invention relates to compact holographic sights for small arms.

BACKGROUND ART

There are several types of sights utilized with small arms, such as rifles, shotguns, hand guns, bows, and other similar, hand-held weapons.

Perhaps the simplest type is the iron sight consisting of a small notch on the near end of the weapon and a bar on the far end of the weapon. When aiming, the notch, the bar, and the target must all be aligned. There are several drawbacks to this simple sight. The shooter must shift his/her focus between the sight and the target, which is difficult, particularly when the shooter or the target is moving. The notch and bar also partially block the targets seen. And, under low ambient light conditions, these sights are difficult to use due to the reduced depth of focus of the eye.

Another common sight is the telescopic sight. With this sight, the image is magnified and a reticle pattern is superimposed on the image scene at an intermediate image plane. Primarily used for aiming at distant stationary targets, telescopic sights are not suitable for use with moving targets or when the shooter is moving, because of the small field of view and exit aperture of the sight.

Another commonly used sight is the reflex type. This sight utilizes an illuminated reticle and a lens that collimates every point of the reticle to project the reticle pattern to the target plane. A partially reflecting mirror or beam combiner is located downstream of the collimating lens to superimpose the reticle pattern over the real world scene. The exit aperture is the same size as the collimating lens, but is recessed further from the viewer. The eye position from which the reticle can be seen is thus restricted by the lens diameter and the recessed exit aperture. Also, these sights are bulky and heavy unless they utilize smaller, simpler collimating lens, in which case the eye position from which the reticle can be seen without parallax is further restricted. The simple lens designs also tend to produce poor off-axis performance, which limits the size of the reticle that can be used.

A second type of reflex sight utilizes a tilted, off-axis spherical or parabolic reflector to collimate a point source from a light-emitting diode (LED). The reflector is spectrally coated to reflect only the red light of the LED and transmit the other wavelengths. This type of sight, commonly referred to as a "red dot sight", can only project a single dot due to the off-axis aberration of spherical or parabolic reflectors.

Laser designator sights are also utilized with small arms. A laser beam, usually from a laser diode, illuminates the target scene. The user positions the laser beam on the target to aim the weapon. This sight is undesirable in many applications since the laser emission could act as a targeting beacon for an adversary. The laser designator sight is also ineffective under many conditions. While laser radiation can maintain a small spot size over a long propagation distance, the brightness of the image of the spot scattered by the target surface reduces with range by a factor of $1/R^2$, where R is the target range. Thus, the laser light spot can be difficult to find under strong ambient light or at longer ranges. Also, the laser designator sight is ineffective in an application having a background, such as the sky, where there is no surface from which the laser beam would be scattered. Moreover, if there is more than one shooter using a laser designator sight, the multiple dots at the target plane can be confusing. Finally, laser designator sights are illegal for hunting in many states because they illuminate the target.

Holographic line sights for large weapons have also been developed. Once such sight is disclosed in U.S. Pat. No. 4,012,150, issued to Upatnieks. This holographic sight, however, is bulky, particularly since it requires a relatively large, stable wavelength laser.

A number of compact hologram displays have been developed, including the edge illuminated holograms disclosed in U.S. Pat. Nos. 4,643,515 and 5,151,800, both also issued to Upatnieks. These hologram displays have a compact monolithic structure. They also utilize a diffraction or reflection grating to minimize the effects of the wavelength drift of the laser diode light beam. These edge illuminated, monolithic holographic displays are, however, relatively expensive, and until now have not been incorporated into sights.

DISCLOSURE OF THE INVENTION

It is therefore an object of the present invention to provide a compact, inexpensive holographic gun sight which may be effectively used with small arms.

It is another object of the present invention to provide a holographic sight which eliminates the parallax between the target and the reticle and allows for a wider range of positioning for the eye.

It is yet another object of the present invention to provide a gun sight with a relatively large exit pupil.

It is yet a further object of the present invention to provide a sight with the above-described properties at a size and weight suitable for use with hand-held weapons.

It is still a further object of the present invention to provide a sight which may utilize different, larger reticle patterns than a single dot, to allow for better visibility of the reticle pattern and, thereby, increased accuracy when aiming at moving targets.

It is another object of the present invention to provide a gun sight which may utilize a three-dimensional reticle pattern.

It is yet another object of the present invention to provide a gun sight having a reticle which is readily visible at high and low ambient light conditions.

Another object of the present invention is to provide a sight which does not project any laser radiation toward the target.

It is yet another object of the present invention to provide a sight having a reticle pattern which can be quickly changed for different types of shooting.

It is yet another object of the present invention to provide a compact sight including means to control the brightness of the reticle image.

It is yet another object of the present invention to provide a sight which utilizes a low cost laser diode that is not emission wavelength stabilized by using an achromatizing means to compensate for wavelength drifts.

It is still a further object of the present invention to provide a compact sight which includes means for adjusting the azimuth and elevation of the reticle pattern.

In carrying out the above and other objectives, the holographic sight of the present invention includes a base having at least one connector for mounting the base on a small arm, and a hologram of a reticle pattern, a compact laser light source for illuminating the hologram, and a power source for the laser diode, each mounted on the base. The sight also includes achromatizing means supported in the path of the light beam for reducing shifts in the position of the reticle pattern due to variations in the wavelength of the light beam emitted from the laser diode. The sight further includes a means for circularizing the generally elliptical beam emitted by the laser diode to provide a uniform illumination pattern for the hologram.

The present invention also preferably includes a collimator for collimating the light beam and a reticle pattern adjuster for varying the azimuth and elevation of the reticle pattern relative to the target.

The compact sight of the present invention also preferably includes a brightness adjuster for varying the intensity of the light beam, thereby controlling the brightness of the reticle pattern.

In one embodiment of the present invention, the collimator is an aspheric collimating lens, and the achromatizing means and circularizing means are a diffraction grating mounted in the path of the beam between the collimating lens and the hologram and tilted at a sharper angle relative to the incoming beam than the hologram.

In another embodiment of the present invention, the achromatizer includes a diffraction grating bonded to a prism to improve the wavelength shift compensation.

In another embodiment of the present invention, the achromatizer includes the aspherical collimating lens bonded to or integral with the prism and the grating to form a single unit to improve rigidity.

In another embodiment of the present invention, the combined collimator and achromatizing means is an off-axis holographic lens. In this embodiment, the lens may be mounted on a prism to again provide improved achromatization.

In one embodiment of the present invention which utilizes a collimated beam, the reticle pattern adjuster includes means for rotating the hologram about horizontal and vertical axes, thereby adjusting the azimuth and elevation of the reticle pattern relative to the target.

The brightness adjuster may include a linear polarizer mounted on a mechanical rotator in front of the laser which emits linearly polarized light.

The brightness adjuster may alternatively include a linear polarizer mounted on the base in the path of, and in alignment with, the linearly polarized light beam, a liquid crystal device mounted in the path of the light beam between the laser diode and the linear polarizer, and variable control means for providing a selected AC voltage to the LCD. The variable voltage applied by the control to the LCD varies the rotation of the plane of the polarized light transmitted through the LCD, thereby controlling the orientation of the beam as it is transmitted to the linear polarizer, and, thus, the intensity of the beam transmitted through the linear polarizer.

In another alternative embodiment, the brightness adjuster includes the use of pulse width modulation of the laser output to vary the perceived brightness of the image. By modulating the laser at a pulse frequency greater than about 60 Hz, the perceived brightness is proportional to the pulse width.

In one embodiment, the brightness adjuster further includes a light sensor which is mounted on the sight to receive light transmitted from the direction of the target. A controller is provided which includes a first input connected to the light sensor and a first output connected to the LCD. The controller includes logic for periodically transmitting an AC voltage to the LCD which varies as a function of the output received by the controller from the light sensor, thereby automatically adjusting the brightness of the reticle pattern as a function of the brightness of the target background.

The above objects and other objects, features, and advantages of the present invention are readily apparent from the following detailed description of the best mode for carrying out the invention when taken in connection with the accompanying drawings.

BEST MODE FOR CARRYING OUT THE INVENTION

Figure 1:
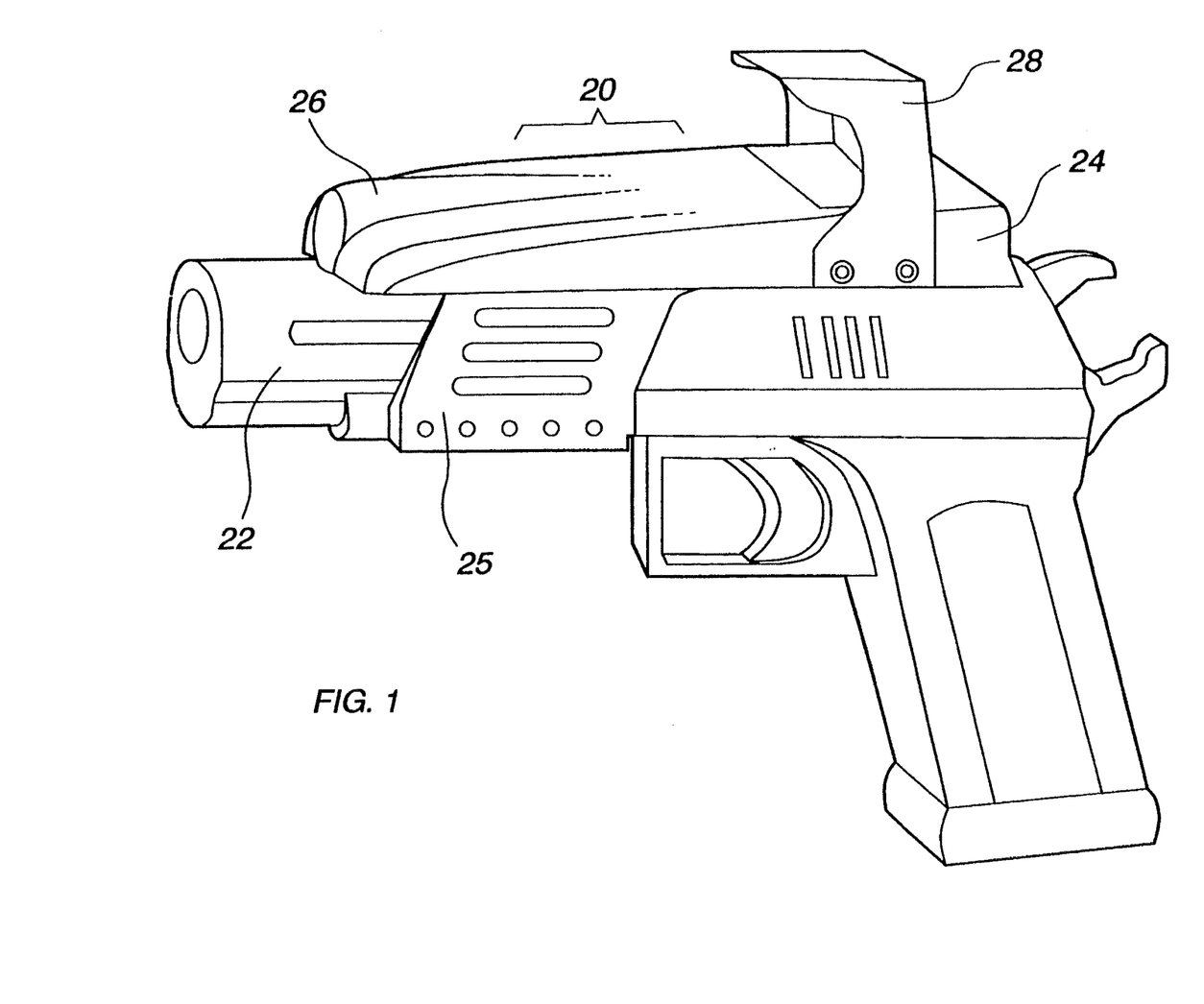
FIG. 1 is a plan perspective view of the holographic sight of the present invention mounted upon a handgun with an integrated mount.

Referring to FIG. 1 of the drawings, the compact holographic sight constructed in accordance with the present invention is generally indicated by 20. This sight 20 may be mounted upon any hand-held arm such as the pistol 22, and includes a base 24 having a mount 25 for attachment to the weapon. A hologram 30 (FIG. 2) having a reticle pattern is mounted within a shroud 28. The other components of the sight are preferably protected from the elements by a cover 26. The base 24, cover 26, and shroud 28 may be manufactured from any lightweight resilient material, such as aluminum or plastic.

The hologram itself can be fabricated by utilizing known recording techniques. For example, the hologram may be fabricated with an off-axis reference beam with the reticle pattern projected to the desired target distance (for example, 25 yards from the hologram) with a lens. The laser illuminates the hologram and a virtual image of the reticle appears at the selected target range to aid the shooter in aiming the weapon. The image of the reticle is formed over the entire hologram and the projected image can be seen from any part of the hologram. Unlike a lens, the thickness of the hologram does not have to be increased with its size. Thus, a large hologram can be fabricated on a thin, flat plate, making the exit aperture of a holographic sight as large as desired without adding the significant bulk of additional and/or larger projection lenses as would be required in larger, conventional sights. With a larger exit aperture, the range of eye positions from which accurate aiming can be achieved is substantially greater. Also, the larger aperture holographic sight has a larger field of view and relatively less obscuration of the target seen by the sight than its bulkier, conventional counterparts.

It will also be appreciated that a three-dimensional reticle pattern can be recorded on the hologram, if required to improve target acquisition.

It should also be appreciated that various types of mounts may be employed as the mount 25 on the sight 20 depending upon the type of weapon, including a Weaver-type mount, a pistol mount, a dovetail mount, a Colt M-16 mount, or another commercially available mounts adapted for use with specific weapons.

Figure 2:
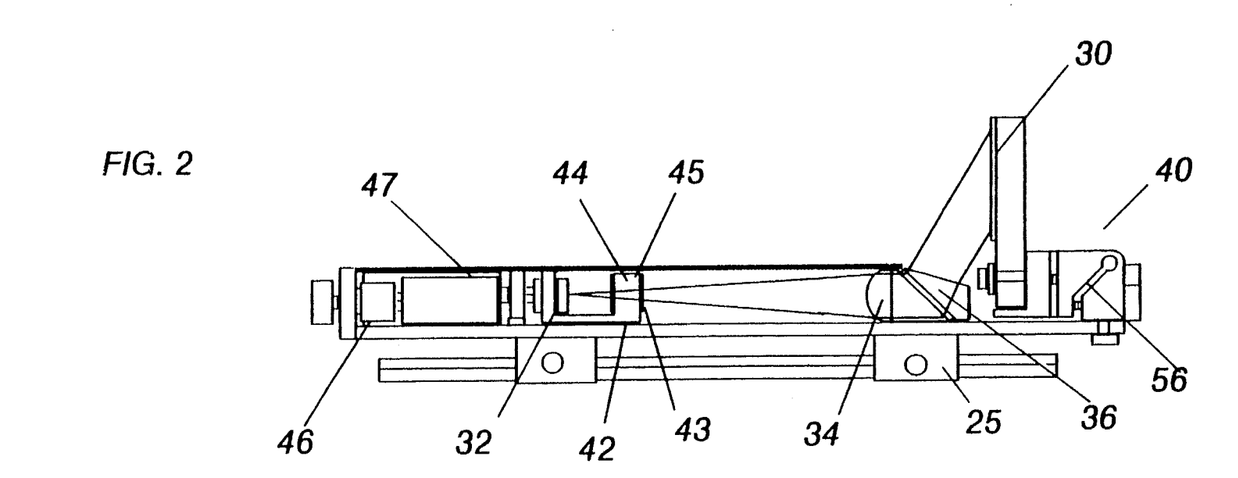
FIG. 2 is a side cross-sectional view of one embodiment of the present invention.
Figure 3:
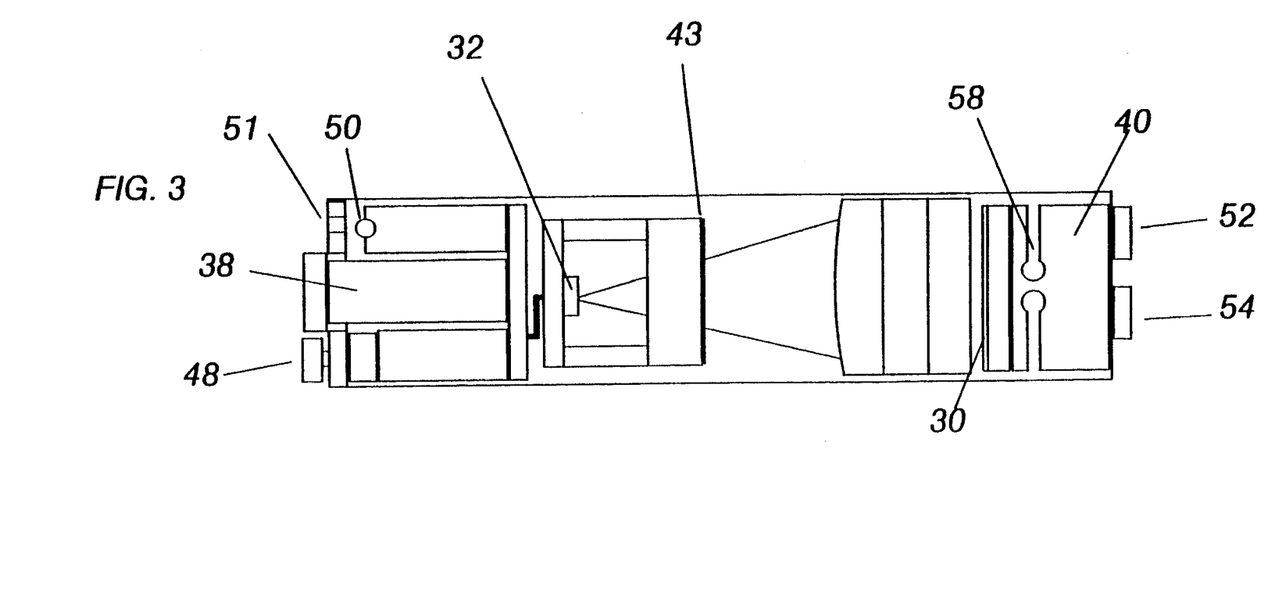
FIG. 3 is a top view of the embodiment of FIG. 2 with the cover removed.

Referring to FIGS. 2 and 3, a compact laser diode 32, such as a Hitachi model HL6720G 670 nm laser diode, is utilized as the light source for illuminating the hologram 30. The laser 32 illuminates the hologram and a virtual image of the reticle appears at the selected target range to assist the shooter in aiming the weapon.

A compact power source 38, such as a Lithium battery, powers the laser 32.

A collimator 34 is preferably interposed in the path of the laser beam to create a collimated beam to play back the hologram 30. As explained in further detail hereafter, the use of a collimated beam allows for easy adjustment for range and windage in the elevation and azimuth directions by rotating the hologram.

Since the laser diode lacks temperature stabilization, the emission wavelength of the laser shifts with temperature by as much as 0.25 nm/°C. Since the angle of diffraction of a hologram is wavelength dependent, the reticle pattern position shifts with changes in the laser wavelength, resulting in aiming error. This deficiency is corrected by interposing achromatizing means 36 comprising a grating bonded on a prism in the path of the beam.

Figure 4:
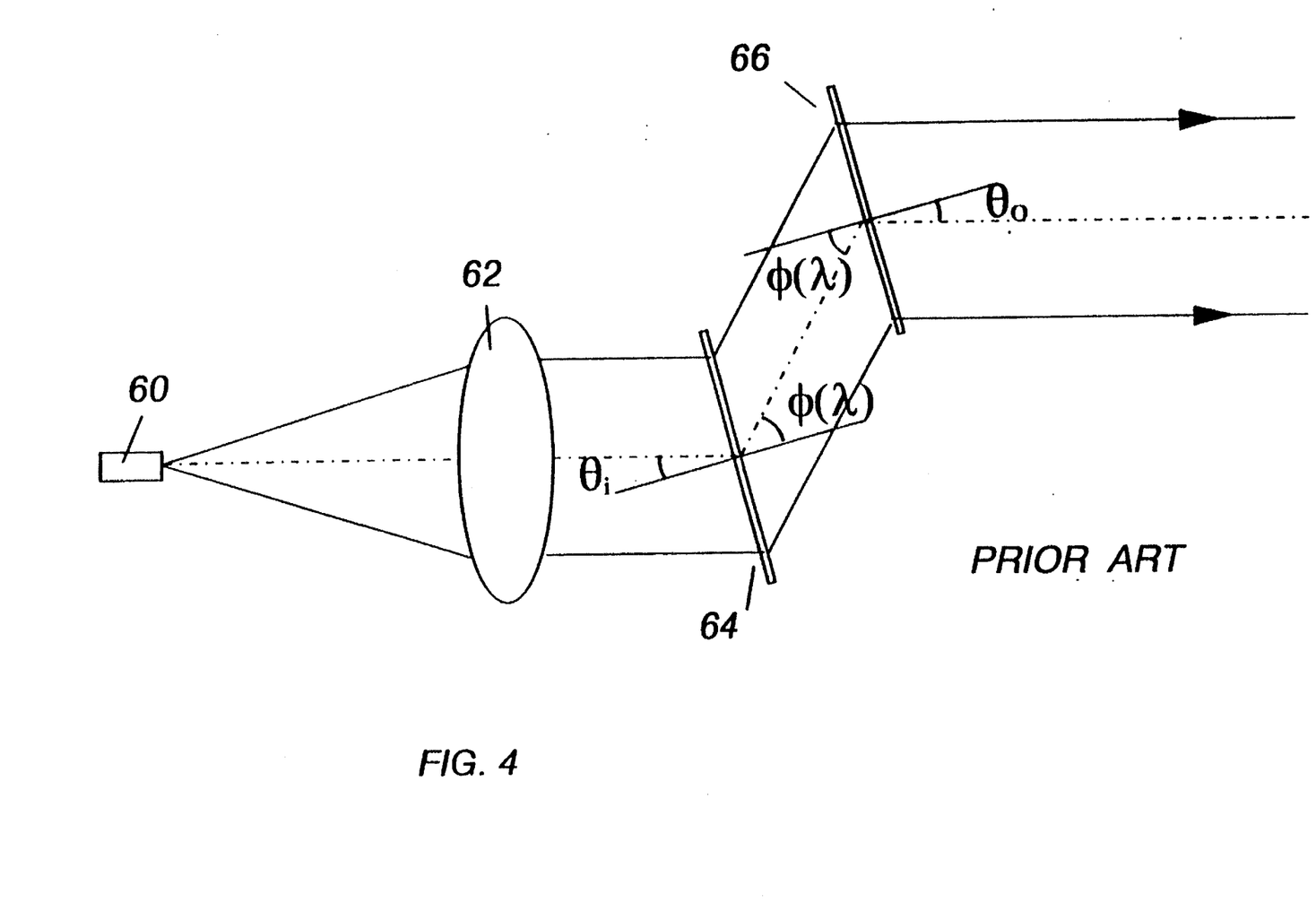
FIG. 4 is a diagram illustrating the conventional means to compensate for wavelength drift.

As illustrated in FIG. 4, one achromatizing means is a diffraction grating 64 which is placed in the path of the beam between the collimating lens 62 and the hologram 66. The grating 64 has the same spatial frequency, F as the hologram. When positioned parallel to the hologram, the grating disburses the light beam by the same amount but diffracted in the opposite direction as the hologram, cancelling the effect of chromatic dispersion. In the example illustrated in FIG. 4, the collimated beam incident on the grating at an angle $\theta_i$ is diffracted at an angle $\phi(\lambda)=\arcsin[\lambda-\sin \theta_i]$, where F is the spatial frequency of the grating in the hologram, and $\lambda$ is the laser wavelength. Since the grating and the hologram are parallel, the incident angle on the hologram is also $\phi(\lambda)$. The output angle is given by $\theta_o=\arcsin[F\lambda-\sin \phi(\lambda)]=\theta_i$. The output angle is therefore always the same as the input angle and is independent of wavelength. Thus, the emission wavelength of the laser diode can drift by a substantial amount without causing any lateral shift of the reticle pattern.

There are two drawbacks, however, to the arrangement shown in FIG. 4. First, the height of the grating and the hologram have to be the same, thereby requiring that a sight employing these parallel elements be at least two times the vertical height of the hologram. Second, the intensity of the laser beam has an elliptical pattern.

Referring again to FIGS. 2 and 3, the two problems associated with the arrangement of FIG. 4 are eliminated in this embodiment by tilting the diffraction grating 36 at a relatively sharper angle to the horizontal plane than the hologram. This orientation can provide significant achromatization. At the same time, this geometry expands the beam size in the direction of diffraction, resulting in a more circular illumination pattern, thereby providing a more uniform illumination of the hologram. It should be noted, however, that by mounting the diffraction grating 36 and the hologram 30 at different angles, the wavelength compensation is not perfect, since the dispersion due to diffraction by the grating is lower than the diffraction by the hologram.

Figure 5:
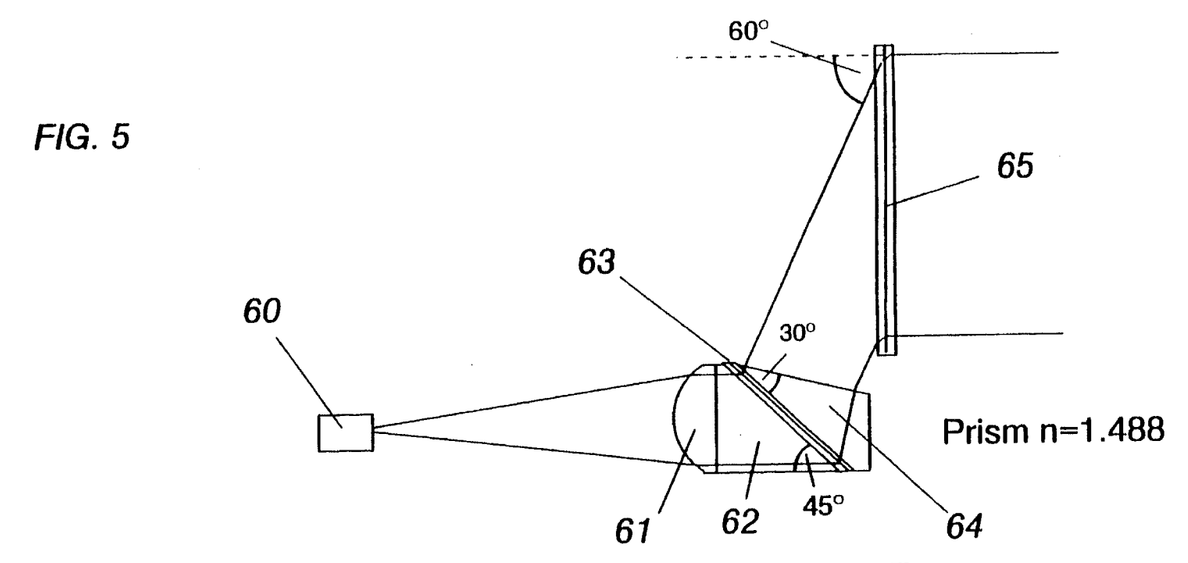
FIG. 5 is a diagram illustrating the wavelength drift compensation accomplished by an embodiment of the present invention employing a grating with a right angle prism and a 30° prism.

To improve the wavelength compensation in this arrangement, the amount of dispersion must be increased. This can be achieved by mounting the diffraction grating 36 on a prism, as shown in FIG. 5. Since the refractive index of the prism material is higher than air, the spatial frequency of the grating is higher. The prism grating combination is, therefore, more dispersive. By choosing an optical material with the proper refractive index for a combination of diffraction angles such that $d\theta_o/d\lambda\sim 0$, near perfect wavelength compensation can be achieved.

Figure 6:
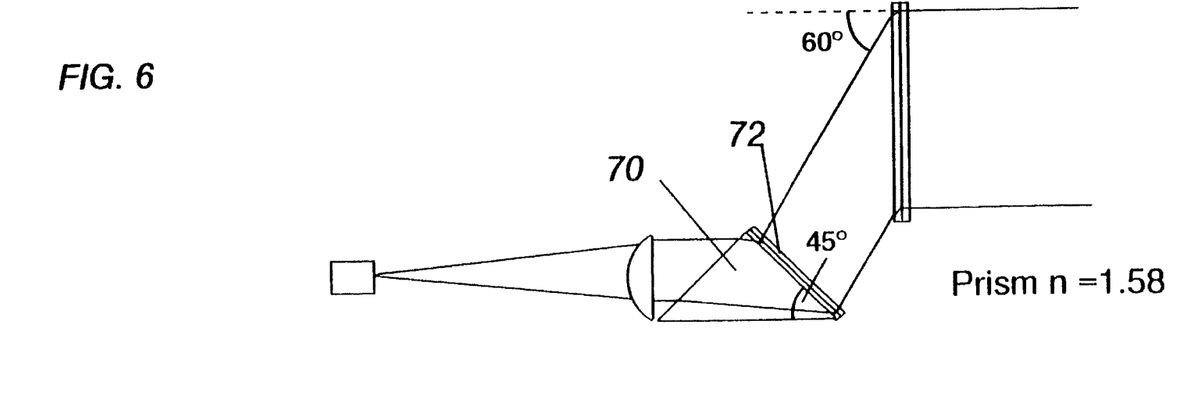
FIG. 6 is a diagram of another embodiment of the present invention employing a grating with one right angle prism.
Figure 7:
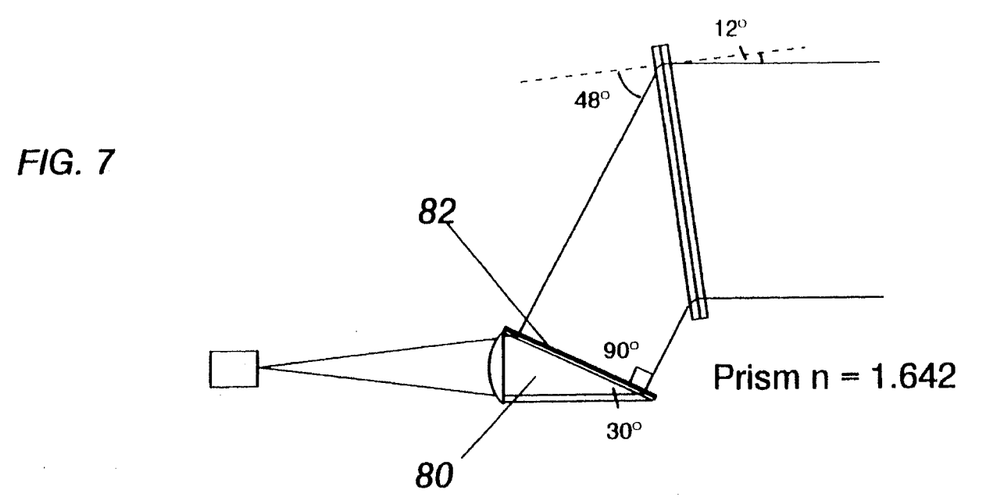
FIG. 7 is a diagram illustrating the wavelength drift compensation accomplished by an embodiment of the present invention employing a grating and a 30°-60°-90° prism.

Three specific design examples, each employing a prism and diffraction grating are shown in FIGS. 5, 6 and 7. The laser light source for each of these embodiments has an emission wavelength of 676.4 nm±Δλ. The embodiment shown in FIG. 5 employs a right angle prism 62 and a 30° prism 64 with a diffraction grating 63 mounted therebetween. The prisms are made from an acrylic with a refractive index of n equal to 1.488. The combination of these prisms with a diffraction grating mounted at 45° to the angle of the incoming beam yields a geometry providing for achromatic operation of a hologram mounted vertically.

In the embodiment shown in FIG. 6, a diffraction grating 72 is bonded to a single right angle prism 70 made of a polycarbonate with a refractive index of n equal to 1.58. This material and geometry also results in the hologram being mounted in a vertical orientation.

In FIG. 7, the diffraction grating 64 is bonded to a 30°-60°-90° prism made from SF-2 glass having a refractive index n equal to 1.642. In this embodiment the refractive index of the prism and the associated geometry would result in the hologram being mounted at an angle of 12° counterclockwise from the vertical plane.

It should be noted that various tilt angles and vertical displacements for the hologram can be achieved by varying the geometry and material of the prisms, as well as the tilt angle of the diffraction grating. Thus, a particular design might be implemented where the primary objective is low profile, while another design might be selected to provide a sight with a hologram having a tilt angle which minimizes glare. These and other design factors can be accomplished with various embodiments of the present invention by modifying any one or more of the refractive materials of the prism and/or the prism angles and corresponding mounting angle of the diffraction grating bonded thereto.

Figure 8:
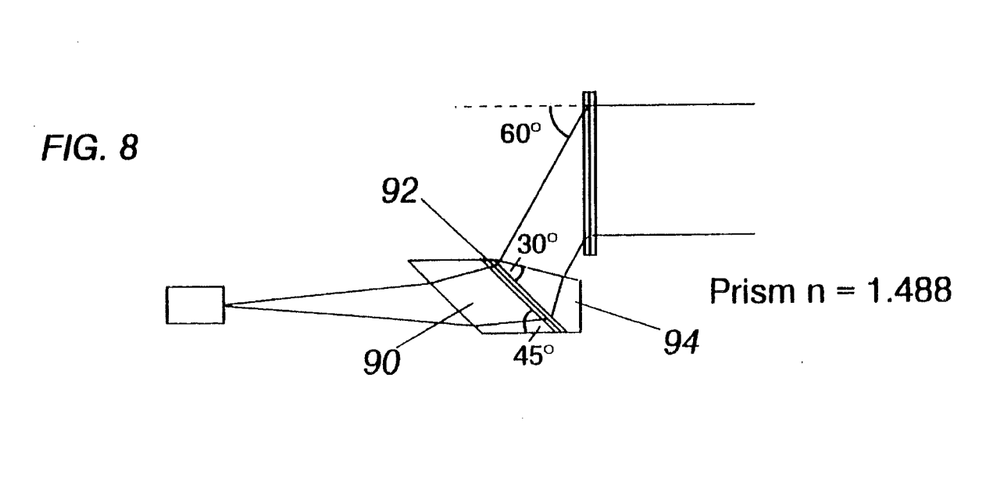
FIG. 8 is a diagram illustrating one embodiment of the present invention that integrates the collimation function into the grating using an off-axis holographic lens.

The design of FIG. 8 may be employed to obtain an inexpensive, lightweight sight with partial compensation of the wavelength drift. The collimation function is integrated into the grating in the form of an off-axis hologram. With this design, lateral shift of the image due to wavelength drift is eliminated but the plane where this reticle pattern is focused will shift with changes in temperature. This design is adequate for applications where a small aiming error is acceptable and/or for use in environments where the ambient temperature does not vary significantly. Alternatively, a refractive aspheric lens can be integrated with the prism to provide near perfect wavelength compensation in a more compact, low profile design, such as previously shown in FIG. 5. It should be noted that aberrations introduced by the refractive collimator can be corrected by the grating by interfering the wavefront produced by the collimator with a perfect collimated beam to produce the holographic grating.

Figure 10:
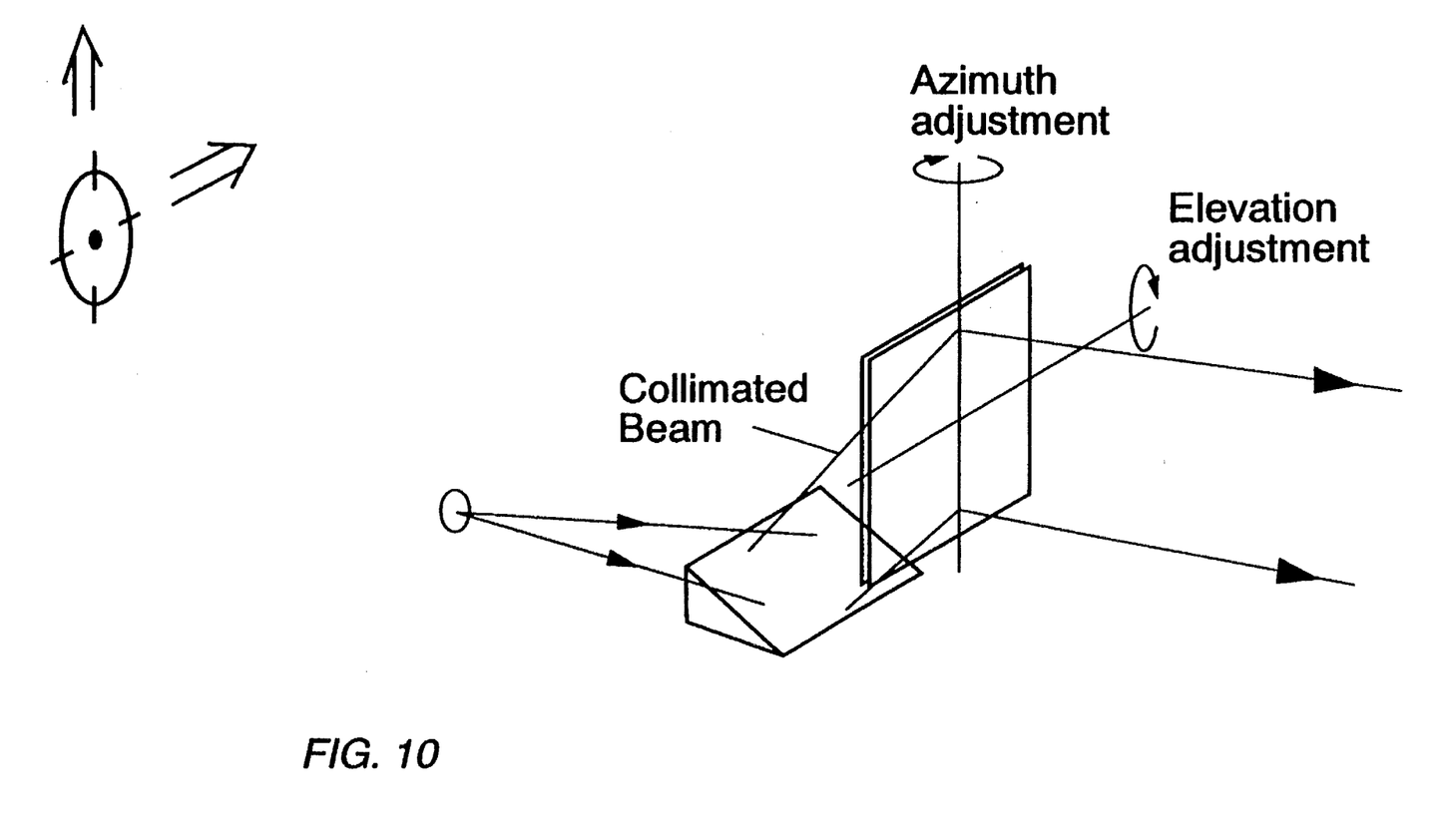
FIG. 10 is a diagram illustrating azimuth and elevation adjustment of the reticle pattern.

As illustrated in FIGS. 2, 3 and 10, a collimated beam is preferably used as the reference beam to record and play back the hologram. This allows the reticle pattern to be adjusted for range and windage in the elevation and azimuth directions by incorporating an adjuster 40 which rotates the hologram about its horizontal and vertical axes. The adjuster 40 may be a simple flex mount. The hologram can be rotated about a horizontal axis by turning a thumbscrew 52 which varies the gap 56 on the adjuster and rotates the hologram, resulting in adjustment of the reticle pattern in the range direction. Similarly, thumbscrew 54 varies the gaps at 58 in the adjuster, thereby rotating the hologram 30 about a vertical axis, resulting in adjustment in the azimuth direction. It should be noted that if the reference beam is not a plane wave (i.e., is not collimated), rotating the hologram about either the vertical or horizontal axes will produce severe aberrations. While azimuth and elevation adjustments can be accomplished in a sight with a non-collimated beam, the adjuster means would have to rotate the entire optical assembly rather than just the image hologram.

The sight also preferably includes a brightness adjuster 44 for varying the intensity of the light beam and thereby controlling the brightness of the reticle pattern. In one embodiment, the brightness adjuster 42 may include a linear polarizer 44 mounted in the path of the beam for rotation about the axis parallel to the path of the beam. This may be implemented by providing a suitable opening in the housing 26, to allow the user to manually rotate the polarizer to obtain the desired reticle pattern brightness.

Figure 9:
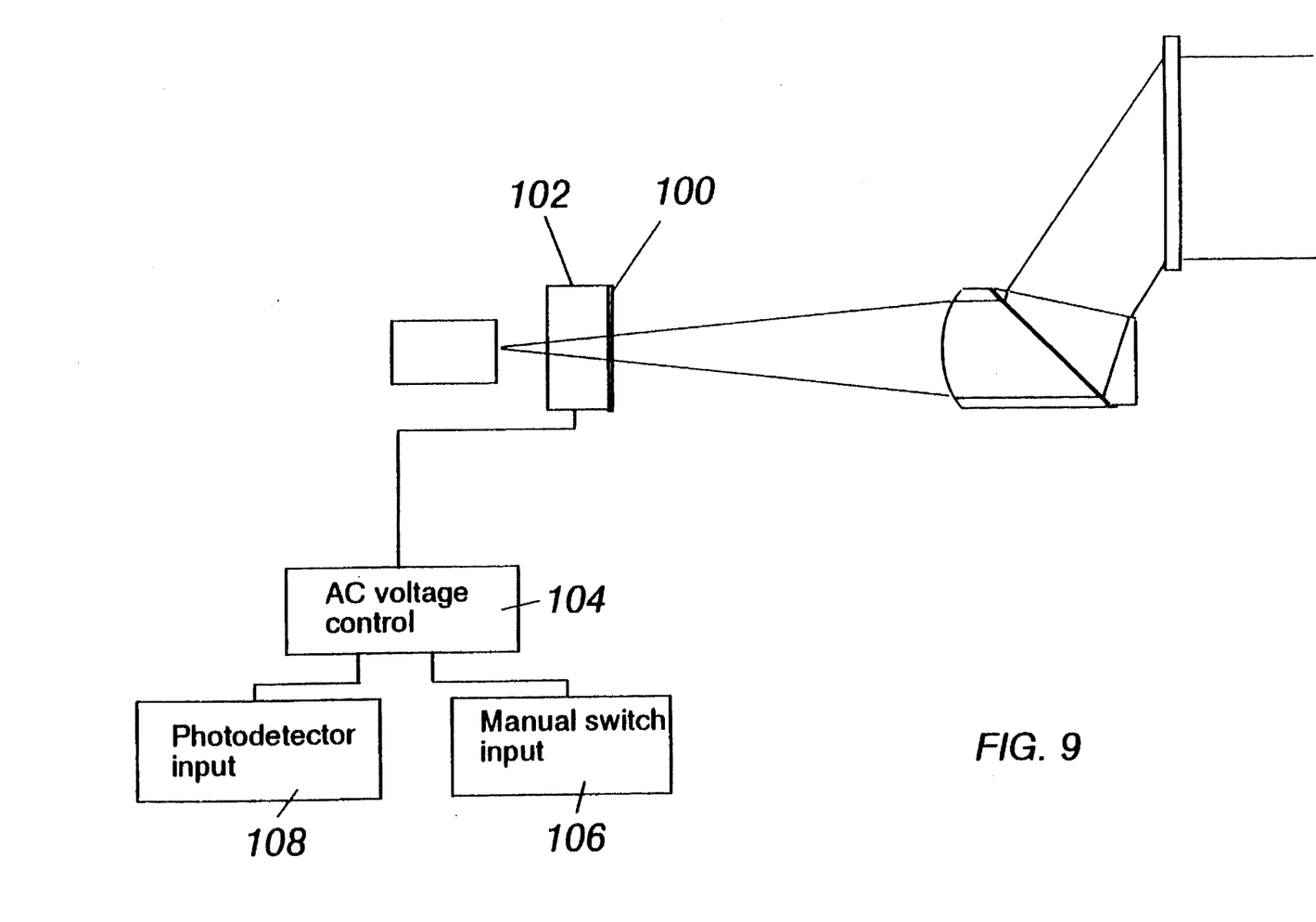
FIG. 9 is a diagram illustrating one embodiment of a brightness adjuster which may be utilized in the present invention.

Alternatively, the brightness can be controlled electrically by including a liquid crystal device interposed in the path of the beam in front of the linear polarizer as shown schematically in FIG. 9. In this embodiment of the brightness adjuster, the linear polarizer 100 is mounted in a fixed position. A liquid crystal device 102 is also mounted in the path of the beam immediately preceding the linear polarizer 100. The liquid crystal device 102 is powered by a conventional AC driving circuit 104. When the liquid crystal device is driven by an AC voltage, the plane of polarization of the light passing through the liquid crystal is rotated by an amount that is dependent upon the driving voltage. The transmittance of the laser light beam through the polarizer can be thus varied continuously by controlling the AC voltage. In one embodiment, a switch 48 (shown in FIG. 3) can be provided for manually adjusting the AC voltage level and, thereby, manually adjusting the brightness of the reticle as described above.

In the embodiment of FIGS. 2 and 3, the brightness adjuster 42 includes a linear polarizer 43 and a liquid crystal device 44 mounted within a housing 45. The liquid crystal display is connected to an AC driving circuit and an AC voltage control as illustrated in FIG. 9. In addition, an ambient light sensor 50 is mounted on the base 24 of the sight to receive ambient light through an aperture 51 from the direction of the target. The ambient light sensor 50 includes an output which transmits a signal that varies as a function of the amount of light detected by the sensor. This output is connected as an input to a controller which, in turn, transmits an output signal to the AC voltage control of the liquid crystal device 44 to automatically vary the voltage as a result of the signal transmitted by the ambient light sensor 50. The transmittance of the laser light beam can thus be varied automatically as a function of the brightness of the target background, as sensed by the ambient light sensor 50.

Figure 12:
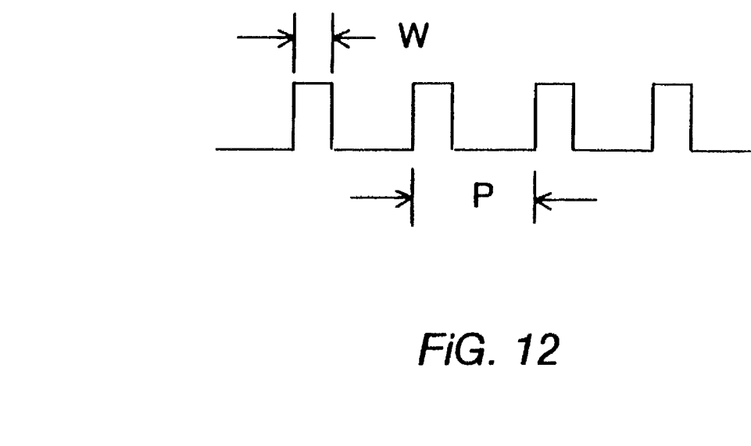
FIG. 12 is a diagram illustrating the pertinent pulse width modulation parameters utilized in one embodiment of the brightness adjuster.

The brightness adjuster 42 may alternatively be implemented by the use of pulse width modulation of the laser output. Referring to FIG. 12, by pulse modulating the laser output at a frequency higher than 60 Hz, and preferably about 100 Hz, the brightness may be varied, since the perceived brightness to the human observer is proportional to the pulse width, w. Thus, a relatively shorter pulse width, w (i.e., a relatively shorter period of time during which the laser is on), results in a proportionately reduced perceived brightness in the reticle pattern. This pulse width modulation of the laser can be accomplished by the addition of a suitable control circuit.

Figure 11:
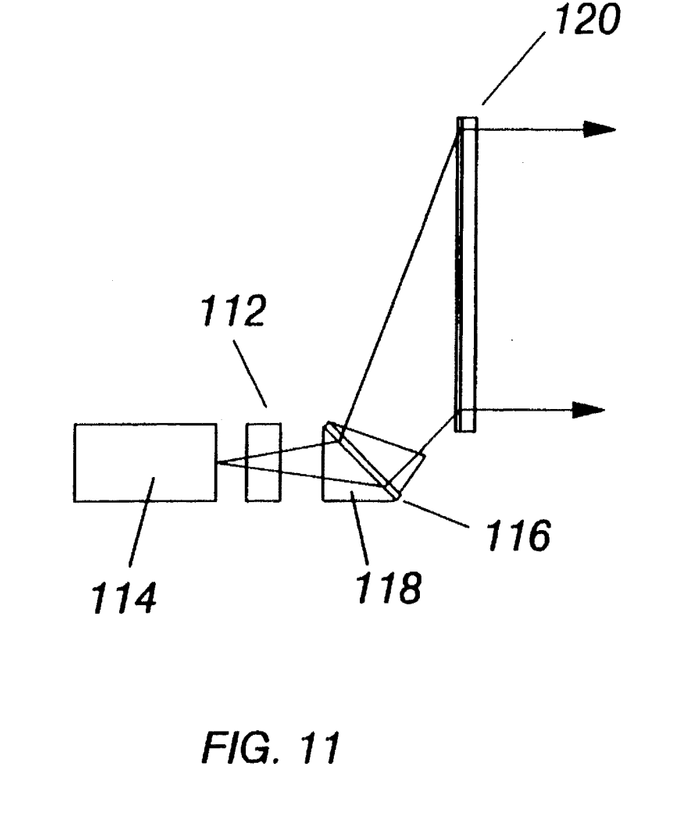
FIG. 11 is a diagram of an embodiment of the present invention employing an uncollimated beam.

It will be appreciated that many other alternative designs may be employed to achieve the compact holographic sight of the present invention without departing from the spirit of the present invention. For example, FIG. 11 illustrates a more compact design which utilizes a negative lens 112 and an uncollimated beam. Thus, the diverging beam emitted from the laser diode 114 is maintained, thereby shortening the length of the gunsight. In the embodiment shown, an off-axis holographic lens 116 bonded to a prism 118 is utilized to achromatize the holographic image and expand the illuminating beam to circularize the beam and provide uniform illumination of the reticle pattern on the hologram 120. Again, the design of FIG. 11 may be employed without the prism 118 with less than perfect wavelength compensation for less demanding applications. It should be noted, however, that as previously described, the azimuth and elevation adjustments of the reticle pattern cannot be accomplished by simply rotating the image hologram as previously described. Instead, the entire optical assembly must be rotated to achieve adjustments of the reticle pattern relative to the target in embodiments using a non-collimated illuminating beam.

Other alternative designs, not shown, may employ compact, edge-illuminated holograms, such as are described in U.S. Pat. Nos. 4,643,515 and 5,151,800, which patents are hereby incorporated herein by reference. It will be appreciated that the use of compact, edge-illuminated holograms may further minimize overall sight dimensions.

In another embodiment, the sight may employ a hologram and/or housing which can be releasably secured to the base to allow for quick replacement of one reticle pattern with another for different types of shooting by simply changing the image hologram.

While the best mode for carrying out the invention has been described in detail, those familiar with the art to which the invention relates will recognize various alternative designs and embodiments for practicing the invention as disclosed by the following claims.

What is claimed is:

1. A compact sight for small arms comprising:
   a base including at least one connector for mounting the base on the small arm;
   a hologram of a reticle pattern mounted on the base;
   a laser diode light source mounted on the base for illuminating the hologram;
   a power source mounted on the base and operably connected to the light source;
   a collimator supported in the path of the light beam for collimating the light beam; and
   a reticle pattern adjuster including means for rotating the hologram relative to the collimated light beam for varying the azimuth and elevation of the reticle pattern relative to a target.

2. The compact sight of claim 1 wherein the collimator is a convex lens.

3. The compact sight of claim 1 wherein the reticle pattern adjuster includes means for rotating the hologram in horizontal and vertical axes.

4. A compact sight for small arms comprising:
   a base including at least one connector for mounting the base on the small arm;
   a hologram of a reticle pattern mounted on the base;
   a laser diode light source mounted on the base for illuminating the hologram;
   a power source mounted on the base and operably connected to the light source;
   a brightness adjuster for controlling the brightness of the reticle pattern.

5. The compact sight of claim 4 wherein the brightness adjuster includes a linear polarizer mounted on the base in the path of, and in alignment with, the linearly polarized light beam, a liquid crystal device mounted in the path of the light beam between the laser diode and the linear polarizer, and variable control means for providing a selected AC voltage to the liquid crystal device to vary the rotation of the plane of the polarized light transmitted through the liquid crystal device, thereby controlling the orientation of the beam being transmitted to the linear polarizer.

6. The compact sight of claim 5 wherein the brightness adjuster further includes a light sensor mounted to receive light transmitted from the direction of the target, a controller including a first input connected to the light sensor and a first output connected to the liquid crystal device, and wherein the controller includes logic for periodically transmitting an AC voltage to the liquid crystal device which varies as a function of the output received from the light sensor.

7. The compact sight of claim 4 wherein the brightness adjuster includes a linear polarizer mounted in the path of the light beam and supported for rotation about an axis perpendicular to the plane of the linear polarizer.

8. The compact sight of claim 4 wherein the brightness adjuster includes means for pulse width modulating the laser output to vary the perceived brightness of the reticle image.

9. A compact sight for small arms comprising:
   a base including at least one connector for mounting the base on the small arm;
   a hologram of a reticle pattern mounted on the base;
   a laser diode light source mounted on the base for illuminating the hologram;
   a power source mounted on the base and operably connected to the light source;
   an off-axis holographic lens supported in the path of the light beam for collimating the light beam.

10. The compact sight of claim 9 wherein the spatial frequency of the hologram and the diffraction grating are the same, the hologram and diffraction grating are mounted in parallel planes so that the collimated beam is incident on the diffraction grating at the same angle that the beam is output from the hologram.

11. A compact sight for small arms comprising:
    a base including at least one connector for mounting the base on the small arm;
    a hologram of a reticle pattern mounted on the base;
    a laser diode light source mounted on the base for illuminating the hologram;
    a power source mounted on the base and operably connected to the light source; and
    an achromatizer including a diffraction grating supported in the path of the light beam for reducing shifts in the position of the alignment indicia due to variations in the wavelength of the light beam wherein the diffraction grating is tilted at a sharper angle than the hologram, and wherein the achromatizer further includes at least one prism bonded to the diffraction grating in the path of the light beam between the laser diode and the diffraction grating.

12. The compact sight of claim 11 wherein the achromatizer includes an off-axis holographic lens.

13. A compact sight for small arms comprising:
    a base including at least one connector for mounting the base on the small arm;
    a hologram of a reticle pattern mounted on the base;
    a laser diode light source mounted on the base for illuminating the hologram;
    a power source mounted on the base and operably connected to the light source;
    a collimator supported in the path of the light beam for collimating the light beam; and
    a diffraction grating mounted in the path of the light beam between the laser diode and the hologram such that the collimated beam is incident on the grating at a sharper angle than the output angle of the hologram, thereby expanding the beam size in the direction of diffraction to provide a uniform illumination pattern for the hologram.

14. A compact sight comprising:
    a hologram of alignment indicia;
    a laser diode for providing linearly polarized light beam for illuminating the hologram;
    collimating means supported in the path of the light beam for collimating the light beam; and
    a brightness adjuster for controlling the brightness of the alignment indicia.

15. The compact sight of claim 14 wherein the brightness adjuster includes a control for pulse width modulating the laser output to vary the perceived brightness of the alignment indicia.

16. The compact sight of claim 14 further including an adjuster including means for rotating the hologram relative to the collimated light beam, for varying the azimuth and elevation of the alignment indicia relative to a target.

17. The compact sight of claim 14 wherein the collimating means is an off-axis holographic lens.

18. The compact sight of claim 14 further including an achromatizer supported in the path of the light beam for reducing shifts in the position of the alignment indicia due to variations in the wavelength of the light beam.

19. The compact sight of claim 18 including a diffraction grating having an integral off-axis holographic lens, the diffraction grating mounted in the path of the light beam such that the diffraction grating serves as an achromatizer and collimator.

20. The compact sight of claim 19 where the diffraction grating is tilted at a sharper angle than the hologram, and wherein the achromatizer further includes at least one prism bonded to the diffraction grating in the path of the light beam between the laser diode and the hologram.

21. A compact sight for small arms comprising:

a base including means for mounting the base to the small arm;

a power source;

a hologram mount secured to the base, the hologram mount including adjustment means for rotating a hologram of alignment indicia mounted thereon about two perpendicular axes in the plane of the hologram;

the hologram supported on the hologram mount generally perpendicular to the line of sight from the viewer to a target;

a laser diode connected to the power source and supported on the base for providing a linearly polarized light beam of relatively unstable wavelength for illuminating the hologram, the light beam having a generally elliptical intensity pattern;

a brightness adjuster for controlling the brightness of the alignment indicia;

collimating means supported in the path of the light beam for collimating the light beam;

achromatizing means supported in the path of the light beam for reducing shifts in the position of the alignment indicia due to variations in the wavelength of the light beam emitted by the laser diode; and circularizing means supported in the path of the light beam for circularizing the light beam to provide a uniform illumination pattern for the hologram.

22. A compact sight for small arms comprising:

a base including means for mounting the base to the small arm;

a power source;

a hologram mount secured to the base, the hologram mount including adjustment means for changing the elevation and azimuth position of the reticle image;

a hologram of alignment indicia supported on the hologram mount generally perpendicular to the line of sight from the viewer to the target, the hologram having a spatial frequency of F;

a laser diode connected to the power source and supported on the base for providing a linearly polarized light beam of a relatively unstable wavelength, λ, for illuminating the hologram, the light beam having a generally elliptical intensity pattern;

a brightness adjuster including, a linear polarizer mounted on the base in the path of, and in alignment with, the linearly polarized light beam, a liquid crystal device mounted in the path of the light beam between the laser diode and the linear polarizer, and a variable control for providing a selected AC voltage to the liquid crystal device to vary the rotation of the plane of the polarized light transmitted through the liquid crystal device as a function of the AC voltage, thereby controlling the orientation of the beam transmitted to the linear polarizer and the brightness of the alignment indicia;

an aspheric collimating lens mounted in the path of the light beam to collimate the diverging beam;

at least one diffraction grating bonded to a prism having a refractive index n and mounted in the path of the collimated beam to direct the light to the hologram at a wavelength-dependent angle which compensates for the wavelength-dependent diffraction of the hologram to produce a stable reticle pattern independent of the laser emission wavelength.

23. The compact sight of claim 22 wherein the diffraction grating and prism are mounted at an angle relative to the angle of the hologram sufficient to expand the beam in the vertical direction to circularize the illumination pattern.

24. The compact sight of claim 22 wherein the adjustment means includes means for rotating the hologram mounted thereon about two perpendicular axes in the plane of the hologram.

25. A compact sight for small arms comprising:

a base including means for mounting the base to the small arm;

a power source;

a hologram mount secured to the base, the hologram mount including adjustment means for changing the elevation and azimuth position of a reticle image;

a hologram of alignment indicia supported on the hologram mount generally perpendicular to the line of sight from a viewer aligning the small arm with a target, the hologram having a spatial frequency of F;

a laser diode connected to the power source and supported on the base for providing a linearly polarized light beam of a relatively unstable wavelength, λ, for illuminating the hologram, the light beam having a generally elliptical intensity pattern;

a brightness adjuster including a control for modulating the output of the laser diode into a pulse train with a frequency greater than 60 Hz and for varying the width of the pulses in the pulse train;

an aspheric collimating lens mounted in the path of the light beam to collimate the light beam; and at least one diffraction grating bonded to a prism having a refractive index n and mounted in the path of the light beam to direct the light to the hologram at a wavelength-dependent angle which compensates for the wavelength-dependent diffraction of the hologram to produce a stable reticle pattern independent of the wavelength of the light beam.

* * * * *

UNITED STATES PATENT AND TRADEMARK OFFICE
CERTIFICATE OF CORRECTION

PATENT NO. : 5,483,362
DATED : January 9, 1996
INVENTOR(S) : ANTHONY M. TAI ET AL.

It is certified that error appears in the above-indentified patent and that said Letters Patent is hereby corrected as shown below:

Column 5, Line 64
Delete "$[\lambda-\sin\theta,]$" and insert $--[F\lambda-\sin\theta_i]--$.

Signed and Sealed this

Fourth Day of June, 1996

Attest:

BRUCE LEHMAN

*Attesting Officer*    *Commissioner of Patents and Trademarks*